United States Patent
Takagi et al.

(10) Patent No.: US 7,050,117 B2
(45) Date of Patent: May 23, 2006

(54) CHANNEL SELECTION DEVICE USED IN DIGITAL/ANALOG BROADCASTING RECEIVER

(75) Inventors: Toshihiro Takagi, Takatsuki (JP); Manabu Yamamoto, Mukou (JP); Yasuhiro Inui, Yao (JP); Yusuke Nishida, Ikoma (JP)

(73) Assignee: Funai Electric Co., Ltd., Daito (JP)

( * ) Notice: Subject to any disclaimer, the term of this patent is extended or adjusted under 35 U.S.C. 154(b) by 445 days.

(21) Appl. No.: 10/053,613

(22) Filed: Jan. 24, 2002

(65) Prior Publication Data

US 2002/0097164 A1  Jul. 25, 2002

(30) Foreign Application Priority Data

Jan. 25, 2001  (JP)  ............... 2001-016520

(51) Int. Cl.
  *H04N 5/44*  (2006.01)
  *H04N 5/445*  (2006.01)
(52) U.S. Cl. ............ 348/725; 348/385.1; 348/473; 348/731; 348/734; 348/563; 725/40; 725/52
(58) Field of Classification Search ............ 348/734, 348/731, 725, 385.1, 473–474, 563–567, 348/569–570; 725/40, 52, 54, 142, 152; H04N 5/44, H04N 5/445
See application file for complete search history.

(56) References Cited

U.S. PATENT DOCUMENTS

| | | | | |
|---|---|---|---|---|
| 5,410,326 A | * | 4/1995 | Goldstein | 348/734 |
| 5,461,427 A | * | 10/1995 | Duffield et al. | 348/555 |
| 5,982,411 A | * | 11/1999 | Eyer et al. | 725/49 |
| 6,084,643 A | * | 7/2000 | Kishtaka et al. | 348/725 |
| 6,104,436 A | * | 8/2000 | Lee | 348/563 |
| 6,215,530 B1 | * | 4/2001 | Wasilewski | 348/731 |
| 6,249,320 B1 | * | 6/2001 | Schneidewend et al. | 348/569 |
| 6,313,886 B1 | * | 11/2001 | Sugiyama | 348/731 |
| 6,367,078 B1 | * | 4/2002 | Lasky | 725/52 |
| 6,396,523 B1 | * | 5/2002 | Segal et al. | 345/863 |
| 6,483,547 B1 | * | 11/2002 | Eyer | 348/473 |
| 6,564,378 B1 | * | 5/2003 | Satterfield et al. | 725/40 |
| 6,731,345 B1 | * | 5/2004 | Lee | 348/553 |
| 6,817,027 B1 | * | 11/2004 | Curreri | 725/28 |
| 6,825,874 B1 | * | 11/2004 | Tripathy | 348/180 |
| 6,836,296 B1 | * | 12/2004 | Terakado et al. | 348/552 |
| 2002/0089603 A1 | * | 7/2002 | Onomatsu | 348/554 |
| 2002/0104102 A1 | * | 8/2002 | Takagi et al. | 725/151 |
| 2002/0104103 A1 | * | 8/2002 | Takagi et al. | 725/151 |
| 2002/0113895 A1 | * | 8/2002 | Takagi et al. | 348/569 |
| 2002/0171775 A1 | * | 11/2002 | Okabe | 348/731 |
| 2004/0133910 A1 | * | 7/2004 | Gordon et al. | 725/37 |
| 2004/0172661 A1 | * | 9/2004 | Yagawa et al. | 725/131 |

(Continued)

FOREIGN PATENT DOCUMENTS

JP  55-026760  2/1980

(Continued)

*Primary Examiner*—Brian P. Yenke
(74) *Attorney, Agent, or Firm*—Crowell & Moring LLP

(57) ABSTRACT

In a channel selection device of the invention used in a digital/analog broadcasting receiver, in instructing changing a channel, either one of the UP/DOWN key pair or the RIGHT/LEFT key pair can be used to change a main channel while changing the other pair to change a sub-channel. Thus, by using the keys distributed between the main channel and the sub-channels, a correlation can be given between the key operations and the channels' hierarchical construction to thereby facilitate the changing and selection of the main channels and the sub-channels in the hierarchical construction in digital/analog broadcasts.

12 Claims, 4 Drawing Sheets

U.S. PATENT DOCUMENTS

2004/0226042 A1* 11/2004 Ellis .......................... 725/43
2005/0010947 A1* 1/2005 Ellis .......................... 725/38
2005/0097604 A1* 5/2005 Shintani et al. ............... 725/44

FOREIGN PATENT DOCUMENTS

JP        11-164214        6/1999

* cited by examiner

CHANNEL SELECTION DEVICE USED IN DIGITAL/ANALOG BROADCASTING RECEIVER

BACKGROUND OF THE INVENTION

The present invention relates to a channel selection device used in a television receiver for receiving digital/analog broadcasts.

There has conventionally been available such a digital/analog broadcasting receiver that is capable of appropriately switching between digital broadcast and analog broadcast according to a channel number input from a channel selection device so that a desired channel of a broadcast can be received without any special key for analog/digital switch-over (see, for example, Japanese Unexamined Patent Publication No. 11-164214). There is also available such a receiver that selects channels to thereby indicate a list of channel information obtained by analyzing a broadcasting signal in order to facilitate the channel selection (see, for example, Japanese Unexamined Patent Publication No. 55-26760).

By the ATSC (Advanced Television Systems Committee) Standard of the North America Digital Broadcasting, for example, besides a prior art analog broadcast, there are originated a BS (Broadcasting Satellite) digital broadcast capable of high-picture-quality and multi-channel broadcasting and a digital broadcast represented by the CS (Communications Satellite) digital broadcast, each of which digital broadcasts is originated in a carrier wave in a predetermined frequency band through a physical channel different from that for analog broadcast, thus generally containing many contents. Other digital broadcasts originated from the same broadcasting station or the same system of broadcasting station as the prior art analog broadcasting station are administered so that the station can be selected and displayed through a virtual channel assigned the same channel numbers as the prior art analog broadcasting channel numbers in order to facilitate the operations of the users accustomed to these prior art channel numbers.

The digital broadcasting virtual channels comprise one main channel and sub-channels which are headed by the main channel number to originate one or a plurality of contents, which channels are given in a hierarchy. The configuration of the sub-channels changes with a broadcasting time band, one of which is exemplified in FIG. 5 which shows a configuration of the sub-channels in a time band (8:00 PM to 12:00 PM) that has a main channel "4".

In FIG. 5, in broadcasting, sub-channels of Nos. 0 to 4 are selected for 8:00 to 9:00 PM, sub-channels of Nos. 0 and 1 are selected for 9:00 to 10:00 PM, sub-channels of Nos. 0 to 4 are selected for 10:00 to 11:00 PM, and sub-channels of Nos. 0 to 3 are selected for 11:00 to 12:00 PM. Among these, the sub-channel of No. 0 (physical channel number of 4-0) involves analog broadcast according to the NTSC (National Television Systems Committee) Standard, while the sub-channels of Nos. 1 to 4 (virtual channels Nos. 4-1 through 4-4) involve digital broadcast. Also, a TV program broadcast through the channel "4-0" is a prior art analog-broadcast one, SD (Standard Definition) programs broadcast through the channels "4-1" through "4-4" are digital broadcast standard-picture-quality one, and an HD (High Definition) program broadcast through the channel "4-1" is a digital broadcast high-picture-quality one.

There is such a prior art digital/analog broadcasting receiver's channel selection device that decodes and analyzes a broadcasting signal to acquire a VCT (Virtual Channel Table) containing channel information and hold a channel map storing this table, so that when the user changes or selects a channel, based on this channel map, an EPG (Electric Program Guide) functioning as an interface is used to display a channel selection screen to thereby operate the key (e., UP key/DOWN key) at the body's operation panel or a remote-control panel, thus enabling him to change or select the channel.

Although this system eliminates a troublesome operation of inputting a channel number, when, as described above, the main channel contains a plurality of sub-channels in a hierarchical construction, the above-mentioned UP key and the DOWN key cannot distribute the main channels and the sub-channels conceptually, so that in case of changing into next main channel, all the sub-channels contained therein must be passed through, thus still being troublesome in operation.

SUMMARY OF THE INVENTION

This invention is made to solve the above-mentioned problem. It is an object of the present invention to provide a well-operable digital/analog broadcasts receiver's channel selection device which uses keys distributed between main channels and sub-channels to thereby facilitate changing and selecting by the user of the main channels and the sub-channels in a hierarchical construction in digital/analog broadcasts.

In order to accomplish the object described above, according to one aspect of the present invention, a channel selection device used in a digital/analog broadcasting receiver comprising a receiving device for receiving an encoded digital/analog broadcasting signal originated from a broadcasting station; a digital/analog decoder for decoding the digital/analog broadcasting signal received from the receiving device and then outputting the signal to a display; a memory for storing channel information contained in the broadcasting signal decoded by the digital decoder; a control unit for controlling sections of the receiver, and an input device for inputting a user's instruction for channel selection to the control unit; wherein the device receives a digital broadcast and an analog broadcast which are originated through different channels, the digital broadcast involves one or a plurality of sub-channels for originating contents, which sub-channels are assigned a virtual channel headed by the same main channel number as that for analog broadcast, and the control unit, upon reception of the channel selection instruction from the input device, makes the receiving device to receive the broadcasting signal of a selected channel and makes the digital decoder to decode the received broadcasting signal, to obtain the channel information contained in the decoded broadcasting signal and then store the channel information in the memory; is characterized in that, the input device has UP/DOWN keys and RIGHT/LEFT keys for giving a channel changing instruction, key pairs of which are assigned for main channel switch-over and sub-channel switch-over respectively; and the control unit preferentially selects the smallest channel number of the sub-channel from among the digital ones if the main channel contains a plurality of sub-channels, in channel changing on the basis of the channel changing instruction sent from the input device.

In such a configuration as above, a digital broadcasting signal contains one or a plurality of sub-channels for originating contents for each main channel with the sub-channels being assigned a virtual channel having the same number as an analog broadcasting channel number, thus permitting a user accustomed to analog broadcasts to select his desired channels without feeling a sense of incompatibility. Since the UP/DOWN keys and the RIGHT/LEFT keys are distributed between the main channel and the sub-channel, when the user wishes to operate the input means to give an instruction for changing the channel, he can use either one of them to switch the main channel while using the other to switch the sub-channel in a correlation between the key operation and the channels' hierarchical construction. Also, if the main channel contains a plurality of sub-channels and when it is changed, such a digital broadcast one of these sub-channels that has the smallest number is selected preferentially. This mechanism is based on such a concept that the sub-channels involve analog broadcast if their have a number "0" and digital broadcast of the same contents if they have a number "1" in operation, so that when a digital broadcast is listened to, the sub-channel "1" has the highest-level channel selection desire among many listeners.

According to another aspect of the present invention, a channel selection device used in a digital/analog broadcasting receiver comprising: a receiving device for receiving an encoded digital/analog broadcasting signal originated from a broadcasting station; a digital/analog decoder for decoding the digital/analog broadcasting signal received from the receiving device and then outputting the signal to a display; a memory for storing channel information contained in the broadcasting signal decoded by the digital decoder; a control unit for controlling sections of the receiver, and an input device for inputting a user's instruction for channel selection to the control unit; wherein the device receives a digital broadcast and an analog broadcast which are originated through different channels, the digital broadcast involves one or a plurality of sub-channels for originating contents, which sub-channels are assigned a virtual channel headed by the same main channel number as that for analog broadcast, and the control unit makes the receiving device to receive the broadcasting signal of a selected channel and makes the digital decoder to decode the received broadcasting signal, in order to obtain the channel information contained in the decoded broadcasting signal and then store the channel information in the memory; is characterized in that, the input device has UP/DOWN keys and RIGHT/LEFT keys for giving a channel changing instruction, key pairs of which are assigned for main channel switch-over and sub-channel switch-over respectively.

In such a configuration as above, a digital broadcasting signal contains one or a plurality of sub-channels for originating contents for each main channel with the sub-channels being assigned a virtual channel having the same number as an analog broadcasting channel number, thus permitting a user accustomed to analog broadcasts to select his desired channels without feeling a sense of incompatibility. Since the UP/DOWN keys and the RIGHT/LEFT keys are distributed between the main channel and the sub-channel, when the user wishes to operate the input means to give an instruction for changing the channel, he can use either one of them to switch the main channel while using the other to switch the sub-channel.

In the device described above, the control unit, in channel changing on the basis of the channel changing instruction sent from the input device, may preferentially select a preset sub-channel from among a plurality of sub-channels if contained in the main channels. Thus, if the main channel contains a plurality of sub-channels and when it is changed, a preset one of these sub-channels is selected preferentially. This preset sub-channel may be such one that is desired in listening by each user.

In the device described above, it may further include an On-Screen Display (hereinafter abbreviated as OSD) output circuit for providing OSD display of a list of the channel information stored in the memory with digital and analog contents as mixed at the display, wherein the OSD output circuit displays a list of the channel information on the display such that the main channels are aligned either horizontally or vertically and the sub-channels corresponding to the main channels are aligned either vertically or horizontally respectively, and also displays a channel selecting cursor which is interlocked with the UP/DOWN key or RIGHT/LEFT key operating instruction given through the input device. Thus, the cursor displayed in a list of the channel information displayed at the display may be interlocked with an instruction for operating by the user of the UP/DOWN keys and the RIGHT/LEFT keys of the input means, thus enabling selecting the channel at the cursor position. By this configuration also, the key operation matches the user's idea, thus facilitating his channel changing operations.

In the configuration above, the cursor may be directly positioned at the top, when the cursor displayed in the channel information list moves as interlocked with the UP/DOWN key or RIGHT/LEFT key operating instruction for changing the main channel given through the input device. Thus, when the cursor moves to a different main channel position according to such an instruction for changing the main channel that is given by the operation of the UP/DOWN keys or the RIGHT/LEFT keys, it is positioned to the top one among main channels always. This facilitates the use of the system bemake the highest part is considered to have considerably a high selection desire often.

DETAILED DESCRIPTION OF THE PREFERRED EMBODIMENT OF THE PRESENT INVENTION

Figure 1:
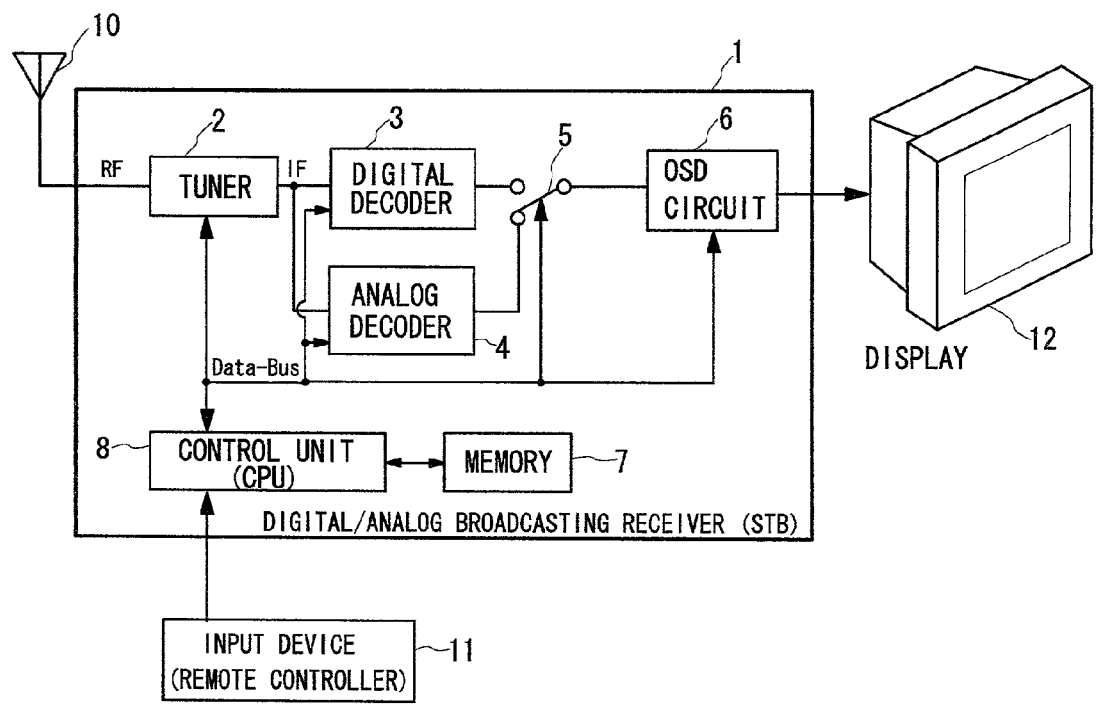
FIG. 1 is a block diagram for showing a digital/analog broadcasting receiver having a channel selection device according to one embodiment of the invention.

The following will describe a digital/analog broadcasting receiver having a channel selection device related to one embodiment of the invention with reference to the drawings. FIG. 1 is a block diagram of the digital/analog broadcasting receiver (hereinafter referred to as receiver). The receiver 1 is a set top box (STB) that receives at an antenna 10 an encoded radio-frequency (RF) digital/analog broadcasting signal originated from a TV broadcasting station to then display a list of the channel information which can be received by a display device 12 for displaying on a screen a video signal contained in the broadcasting signal corresponding to operations for channel information display by the user by use of the body button or an input device 11 such as a later-described remote controller 30 shown in FIG. 2.

The receiver 1 comprises a tuner 2 (receiving means) for receiving a digital/analog broadcasting signal which is present in a frequency band corresponding to a desired channel, a digital decoder 3 and an analog decoder 4 (analog/digital decoding means) for decoding the digital/analog broadcasting signal received at the tuner 2, a switch 5 for switching the broadcasting signals decoded by the digital decoder 3 and the analog decoder 4, an OSD circuit (OSD output means) for providing predetermined On-Screen Display (hereinafter abbreviated as OSD) at a display 12, a memory 7 for storing the originated frequencies of each digital broadcasting main channel and the channel configuration information, and a control unit 8 (control means) consisting of a CPU for controlling these sections of the receiver.

The tuner 2 is supplied with a digital/analog broadcasting signal received through the antenna 10 to then select a channel according to an instruction the user input to the control unit 8 from the input device 11 to thereby receive a digital/analog broadcasting signal of a frequency band corresponding to an input channel and modulate it into an intermediate frequency (IF) signal and then output it to the digital decoder 3 and the analog decoder 4. The digital decoder 3 and the analog decoder 4 decode the broadcasting signal received by the tuner 2. In the digital broadcasting channel configuration, each main channel is assigned each frequency band so that the sub-channels of the same main channel are used to originate broadcasting signals of the same frequency. However, the physical channels are different even in digital broadcast using a virtual channel headed by the same number as that of analog broadcast, so that the broadcasting signals are originated in carrier waves of different frequency bands. If a user-selected channel is of digital broadcast (if the sub-channels are not of number "0"), the broadcasting signal is decoded by the digital decoder 3. If the user-selected channel is of analog broadcast (if the sub-channels are of number "0"), the signal is decided by the analog decoder 4.

The switch 5 receives an instruction from the control unit 8 to then output to the OSD circuit 6 a broadcasting signal decided by either the digital decoder 3 or the analog decoder 4. The OSD circuit 6 in turn receives an instruction from the control unit 8 to then output the broadcasting signal to the display 12 and also output an OSD display signal for displaying a list of the receivable channel information. The memory 7 stores the information of each channel's frequency band and the channel configuration information as well as the information of OSD display at the time of shipment of the receiver.

The control unit 8 receives a user's input through the input device 11 to then control the sections through a data bus (Data-Bus) and make the memory 7 to store the information of each channel's frequency band and the received channel information, thus referencing the information as occasion demands, for example, when a channel is selected.

Also, the control unit 8 receives a user's instruction for channel changing to then make the tuner 2 to receive a broadcasting signal containing channel configuration information and then analyzes a VCT (Virtual Channel Table) given as the channel information obtained by decoding this broadcasting signal at the digital decoder 3, thus obtaining a status signal contained therein. This status signal generally contains all the digital/analog sub-channel information of a virtual channel. The control unit 8, therefore, can analyze that VCT to thereby obtain a virtual channel number consisting of the same number (main channel) as the previous channel number given to the same of the same system of broadcasting station originating the above-mentioned digital/analog broadcasting signal and a sub-channel number. That is, the control unit 8 can collectively obtain the digital/analog channel information originated from the same or the same system of broadcasting station. The control unit 8 stores thus obtained status signal in the memory 7, thus storing the channel information therein.

Figure 3:
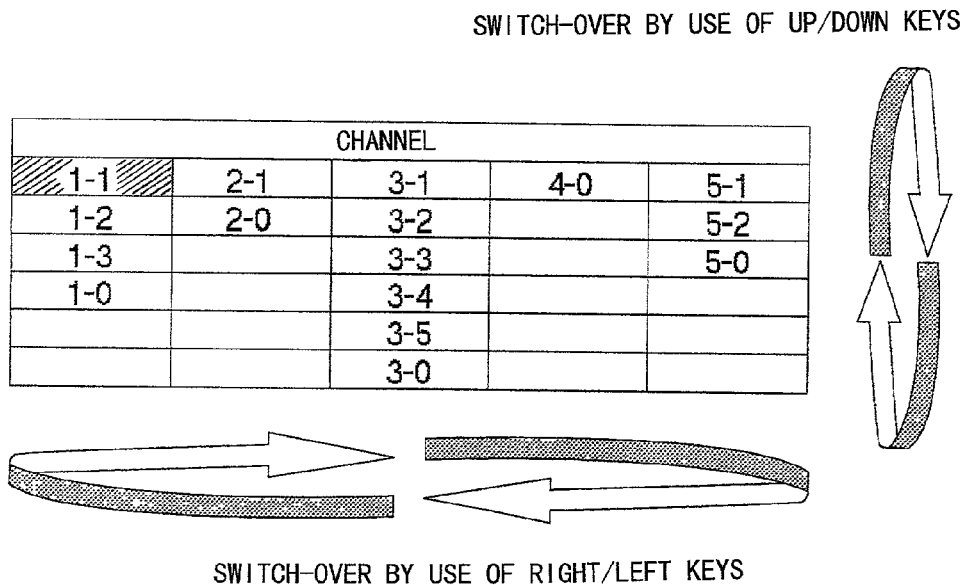
FIG. 3 is a table showing a channel information display screen and a concept of channel selection with the channel selection device.

Further, the control unit 8, when having received a user's instruction from the input device 11, references the data stored in the memory 7 to then indicate in OSD display such a later-described channel information table as shown in FIG. 3 at the display 12 and also moves a displayed cursor for channel selection to thereby display a video program of a selected broadcast.

The display 12 may be a display screen of a television receiver, a CRT, or a flat panel display such as an LCD (Liquid Crystal Display) or PDP (Plasma Display Panel). Although not shown, the receiver 1 is equipped with a D/A converter circuit for converting a digital signal into an analog one so that the signal for the OSD display or image display is converted by this D/A converter circuit into an analog signal and then output to the display 12. Also, the D/A converter circuit may be built in the display 12. Note here that to display contents on the flat panel display, the signal bypasses the D/A converter signal and is output as it is.

Figure 2:
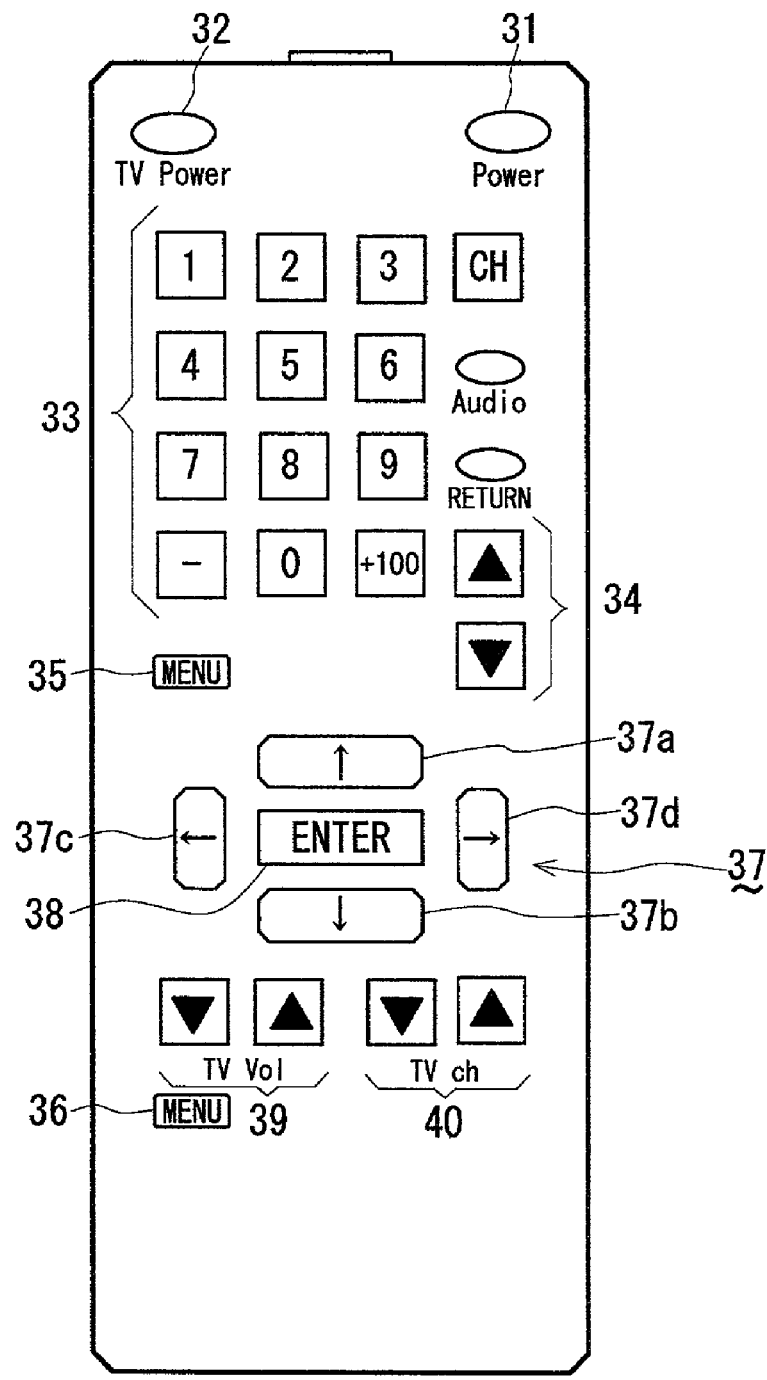
FIG. 2 is a plan view for showing a remote controller which constitutes part of the channel selection device.

The input device 11 is used to input a user's instruction to the control unit 8. The input device 11 may come in the body button provided on the front panel of the receiver 1 or a remote controller 30 such as shown in FIG. 2. In FIG. 2, the remote controller 30 is adapted to give an instruction in the form of an ultraviolet ray etc. to operate the receiver 1 and the television receiver, comprising power keys 31 and 32 for turning ON and OFF respectively the power of the receiver 1 and the television receiver, a numeric keypad 33 for inputting a channel number of the receiver 1, a channel UP/DOWN key pair 34 for changing the channel, menu keys 35 and 36 for calling a menu screen of the receiver 1 and the television receiver respectively, keys 37 (37*a*–37*d*) for moving the cursor in any desired directions, an entry (ENTER) key 38 for assuring an input, a sound-volume UP/DOWN key pair 39 for adjusting a sound volume of the television receiver, and a channel UP/DOWN key pair 40 for changing the television receiver channel.

Of the keys 37, the RIGHT/LEFT keys 37*c* and 37*d* are assigned for changing the main channel, while the UP/DOWN keys 37*a* and 37*b* are assigned for moving the cursor to thereby switch the sub-channel in each main channel. The assignment of the UP/DOWN keys 37*a* and 37*b* and the RIGHT/LEFT keys 37*c* and 37*d* may be reversed.

The following will describe an example of a hierarchical construction of a channel information table (channel map) held in the memory 7 of the receiver 1 with reference to FIG. 3. A list of this channel information can be given as an EPG (Electric Program Guide) in OSD display at the display 12 when the user gives an instruction to the control unit 8 using the menu key 35 on the remote controller 30. The channel information is comprised of the channel information of an analog broadcast ("1-0", "2-0", "3-0", . . . ) and the channel information of a digital broadcast provided with a virtual channel headed by the same number as this analog broadcast's main channel number ("1-1", "1-2", "1-3", "2-1", "3-1", "3-2", . . . ). In the list, the main channels are arranged sequentially in the horizontal direction and vertically are sequentially arranged the digital broadcasting virtual channels (in an ascending order) and analog broadcasting channels for each channel from the top. The arrows in FIG. 3 conceptually indicate channel switch-over by use of the UP/DOWN keys and the RIGHT/LEFT keys and the shaded portions indicate the cursor.

Also, in changing the channel based on an instruction for main channel changing, if the main channel contains a plurality of sub-channels, the control unit 8 is to preferentially select the smallest channel number of sub-channel "1" of the digital sub-channels. In operation, sub-channel "0" involves an analog broadcast and sub-channel "1" involves a digital broadcast of the same contents in transmission, so that in viewing of a digital broadcast, sub-channel 1 is considered in concept to have comparatively a high channel selection desire from the viewers. If a main channel changing instruction goes out of a range shown in FIG. 3, the list is to be scrolled. In the case of a main channel not involving digital broadcast, an analog channel is to be selected.

Figure 4:
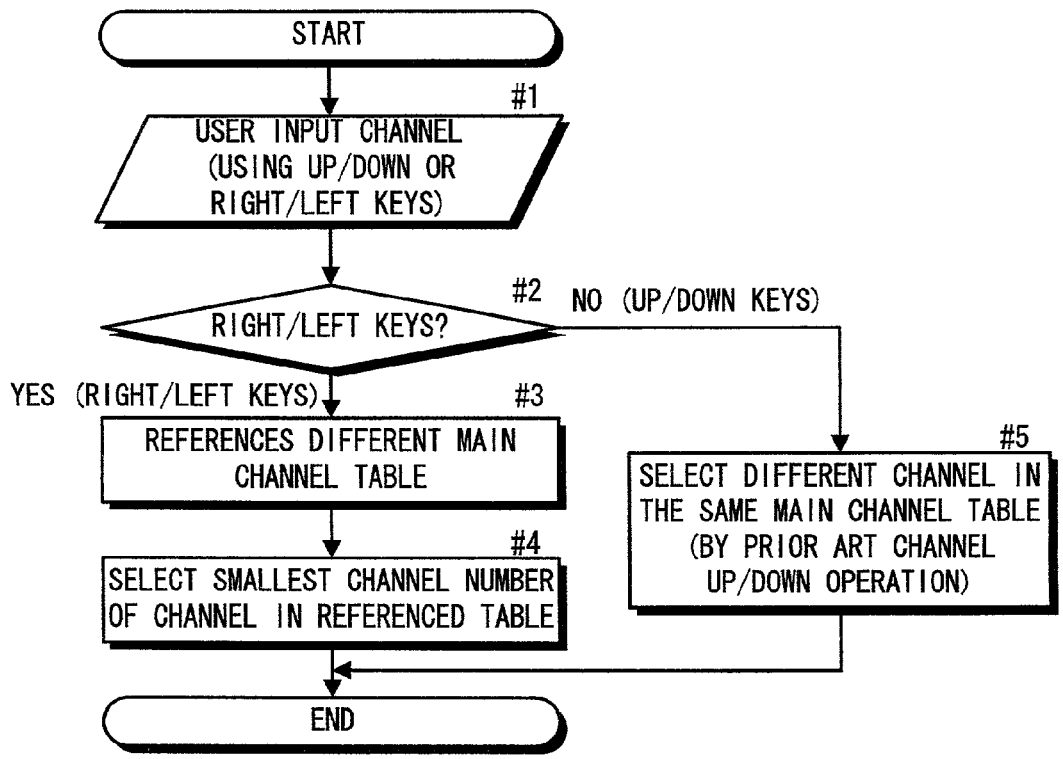
FIG. 4 is a flowchart for showing operations with the channel selection device.
Figure 5:
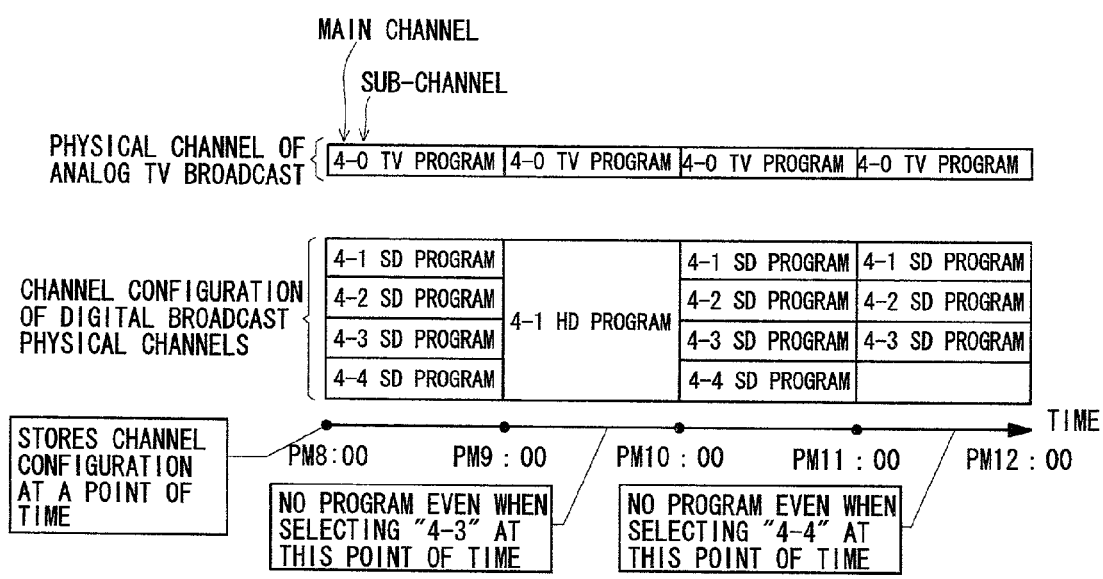
FIG. 5 is an illustration for showing a configuration of channels for digital broadcasts received by the digital/analog broadcasting receiver.

FIG. 4 shows a procedure for channel switch-over by the control unit 8 by use of the keys 37 (37a to 37d) corresponding to the channel key. Upon user's channel key inputting (#1), the control unit 8 decides whether the RIGHT/LEFT key is pressed (#2) and, if so, references a different main channel table (#3) to thereby select the smallest channel number in the table (#4). If the RIGHT/LEFT key is not pressed at #2, on the other hand, it decides that the UP/DOWN key is pressed to then select a different channel in the same main channel table (#5). The processing of #5 alone is equal to that with the conventional UP/DOWN keys. The channel can be selected by pressing the ENTER key 38.

In this embodiment, since the UP/DOWN keys 37a and 37b and the RIGHT/LEFT keys 37c and 37d are distributed between the main channel and the sub-channel, either one of them can be used to switch the main channel while switching the sub-channel. This, therefore, gives a correlation between the cursor movement by use of these keys and the channels' hierarchical construction to thereby match the key operation with the user's idea, thus facilitating the channel changing operations. Also, the virtual channels are used, so that the user accustomed to analog broadcasts can be selected his desired channels without feeling a sense of compatibility.

Also, by preferentially selecting a preset sub-channel when the main channel is changed, the operability can be improved. Also, from a viewpoint that many users have rather limited important main channels, a prior art channel changing device by use only of the RIGHT/LEFT or UP/DOWN keys is just an interface for handling all the channels equivalently and so inefficient in operation, whereas a device of the invention in which the RIGHT/LEFT and UP/DOWN keys are distributed between the main/sub channels makes it possible to easily select an important channel even in multi-channel broadcasting, thus providing an efficient interface.

Also, in the channel information list, the main channels are aligned horizontally and the sub-channels of each of these main channels are aligned vertically with the cursor being interlocked with a key operation instruction for channel selection, thus improving also the visual operability. Also, the cursor is adapted to be directly positioned at the top among the main channels once moved to thereby facilitate use bemake the top channel has comparatively a high selection desire often.

Note here that the invention is not limited to this embodiment but applicable to many variants; for example, the receiver 1 may be built in the body of a television receiver or a VCR (Video Cassette Recorder).

The invention gives a correlation between the key operations and the channels' hierarchical construction, thus enabling simple and rapid changing and selection of the channels. In particular, from a viewpoint that many users have rather limited important main channels, a prior art device for changing the channel by use of only the UP/DOWN keys is just an interface for handling all the channels equivalently and so may be inefficient in operation, whereas a device of the invention in which the RIGHT/LEFT and UP/DOWN keys are distributed between the main/sub channels makes it possible to select an important channel even if one broadcasting station transmits signals through a larger number of channels, thus realizing an efficient interface.

Also, this configuration of the invention enables efficient channel changing operations bemake many users are expected to view rather specific ones among the main channels and bemake the above-mentioned small channel numbers of sub-channels have a high channel selection desire of the viewers in the currently-operated digital broadcast.

What is claimed is:

1. A channel selection device used in a digital/analog broadcasting receiver comprising:
   a receiving device for receiving an encoded digital/analog broadcasting signal originated from a broadcasting station;
   a digital/analog decoder for decoding the digital/analog broadcasting signal received from the receiving device and then outputting the signal to a display;
   a memory for storing channel information contained in the broadcasting signal decoded by the digital decoder;
   an on-screen display output circuit, which provides a matrix display of channel information, wherein different main channels are listed across rows of the matrix and sub-channels are listed in a same column of the matrix as a corresponding main channel;
   a control unit for controlling sections of the receiver, and,
   an input device for inputting a user's instruction for channel selection to the control unit;
   wherein the device receives a digital broadcast and an analog broadcast which are originated through different channels, the digital broadcast involves one or a plurality of sub-channels for originating contents, which sub-channels are assigned a virtual channel headed by the same main channel number as that for analog broadcast, and;
   the control unit, upon reception of the channel selection instruction from the input device, makes the receiving device to receive the broadcasting signal of a selected channel and makes the digital decoder to decode the received broadcasting signal, to obtain the channel information contained in the decoded broadcasting signal and then store the channel information in the memory;
   wherein the input device has UP/DOWN keys assigned for sub-channel switch-over and RIGHT/LEFT keys assigned for main channel switch-over; and
   wherein the control unit selects the smallest channel number of the sub-channel from among the digital ones if the main channel contains a plurality of sub-channels, in channel changing on the basis of the channel changing instruction sent from the input device.

2. The channel selection device used in the digital/analog broadcasting receiver according to claim 1, wherein the control unit, in channel changing on the basis of the channel changing instruction sent from the input device, selects a preset sub-channel from among a plurality of sub-channels if contained in the main channels.

3. The channel selection device used in the digital/analog broadcasting receiver according to claim 1, wherein the OSD output circuit displays a channel selecting cursor which is interlocked with the UP/DOWN key or RIGHT/LEFT key operating instruction given through the input device.

4. The channel selection device used in the digital/analog broadcasting receiver according to claim 3, wherein the cursor is directly positioned at the top, when the cursor displayed in the channel information list moves as interlocked with the UP/DOWN key or RIGHT/LEFT key operating instruction for changing the main channel given through the input device.

5. A channel selection device used in a digital/analog broadcasting receiver comprising:
 a receiving device for receiving an encoded digital/analog broadcasting signal originated from a broadcasting station;
 a digital/analog decoder for decoding the digital/analog broadcasting signal received from the receiving device and then outputting the signal to a display;
 a memory for storing channel information contained in the broadcasting signal decoded by the digital decoder;
 a control unit for controlling sections of the receiver, and,
 an input device for inputting a user's instruction for channel selection to the control unit;
 an On-Screen Display (OSD) output circuit that provides a matrix display of channel information stored in the memory with digital and analog contents as mixed at the display, wherein different main channels are listed across rows of the matrix and sub-channels are listed in a same column of the matrix as a corresponding main channel,
 wherein the device receives a digital broadcast and an analog broadcast which are originated through different channels, the digital broadcast involves one or a plurality of sub-channels for originating contents, which sub-channels are assigned a virtual channel headed by the same main channel number as that for analog broadcast, and;
 the control unit makes the receiving device to receive the broadcasting signal of a selected channel and makes the digital decoder to decode the received broadcasting signal, in order to obtain the channel information contained in the decoded broadcasting signal and then store the channel information in the memory
 wherein the input device has UP/DOWN keys assigned for sub-channel switch-over and RIGHT/LEFT keys assigned for main channel switch-over.

6. The channel selection device used in the digital/analog broadcasting receiver according to claim 5, wherein the control unit, in channel changing on the basis of the channel changing instruction sent from the input device, selects a preset sub-channel from among a plurality of sub-channels if contained in the main channels.

7. The channel selection device used in the digital/analog broadcasting receiver according to claim 5, wherein the OSD output circuit displays a channel selecting cursor which is interlocked with the UP/DOWN key or RIGHT/LEFT key operating instruction given through the input device.

8. The channel selection device used in the digital/analog broadcasting receiver according to claim 7, wherein the cursor is directly positioned at the top, when the cursor displayed in the channel information list moves as interlocked with the UP/DOWN key or RIGHT/LEFT key operating instruction for changing the main channel given through the input device.

9. A method for channel selection in a digital and analog broadcast receiver, the method comprising the acts of:
 receiving digital and analog broadcast signals, wherein each of the analog broadcast signals correspond to a main channel, the digital broadcast signal involves one or more sub-channels, each of the one or more sub-channels being assigned a virtual channel using a same main channel as that of a corresponding analog channel;
 assigning a first set of responses to an up or down command, and a second set of responses to a right or left command;
 outputting a matrix display of channel information, wherein different main channels are listed across rows of the matrix and sub-channels are listed in a same column of the matrix as a corresponding main channel;
 receiving a up, down, right or left command;
 responding to the received command, wherein the first set of responses selects a sub-channel and the second set of responses selects a main channel.

10. The method according to claim 9, further comprising the act of:
 selecting a preset sub-channel from among a plurality of sub-channels, if contained in the main channels, based on receipt of the left or right command.

11. The method of claim 9, further comprising the act of:
 outputting a channel selecting cursor which is interlocked with the up or down commands or the right and left commands.

12. The method of claim 11, wherein the cursor is directly positioned at the top, when the cursor displayed in the matrix display of channel information list moves as interlocked with the up or down commands or the right or left commands.

* * * * *